United States Patent
Miyazawa et al.

[11] Patent Number: 6,127,431
[45] Date of Patent: Oct. 3, 2000

[54] PROTEIN REMOVED β-1,3 GLUCAN AND COUPLING MEDIUM FOR PROBE OF ULTRASONOGRAPH CONTAINING SAME

[75] Inventors: Kazuyuki Miyazawa; Toshio Yanaki, both of Yokohama, Japan

[73] Assignee: Shiseido Company, Ltd., Tokyo, Japan

[21] Appl. No.: 09/115,744

[22] Filed: Jul. 15, 1998

[30] Foreign Application Priority Data

Jul. 25, 1997 [JP] Japan ................................ 9-215826

[51] Int. Cl.$^7$ ............................ B01J 13/00; C12P 19/04
[52] U.S. Cl. ........................ 516/105; 73/644; 435/101; 536/123.12
[58] Field of Search ............... 516/105; 73/644; 514/944; 252/408.1; 435/101; 536/123.12

[56] References Cited

U.S. PATENT DOCUMENTS

| | | | |
|---|---|---|---|
| 3,754,925 | 8/1973 | Kimura et al. | 516/105 X |
| 4,905,700 | 3/1990 | Wokalek et al. | 128/600 |
| 4,966,953 | 10/1990 | Shikinami et al. | 528/60 |
| 5,039,774 | 8/1991 | Shikinami et al. | 528/60 |
| 5,688,775 | 11/1997 | Renn et al. | 536/123.12 X |

FOREIGN PATENT DOCUMENTS

| | | |
|---|---|---|
| 528 005 | 3/1983 | Australia . |
| 0 515 216 | 11/1992 | European Pat. Off. . |
| 62-89765 | 4/1987 | Japan . |
| 62-298342 | 12/1987 | Japan . |
| 2190747 | 11/1987 | United Kingdom ........ 73/644 |

OTHER PUBLICATIONS

Michihiro; "Endotoxin–Free Beta–1,3–Glucan, Its Production and Gel Material for Medical Purpose"; Publication No. 08 269102; Publication Date: Oct. 15, 1996; vol. 97, No. 2; (Feb. 28, 1997).

Michihiro; "Contact Medium for Probe of Ultrasonic Diagnostic Device"; Publication No. 07 124154; Publication Date; May 16, 1995; vol. 95, No. 8; (Sep. 29, 1995).

Database WPI Week 7427; Derwent Publications Ltd., London, GB; AN 49295V; XP002087235 & JP 49 025196; (Mar. 6, 1974).

*Primary Examiner*—Richard D. Lovering
*Attorney, Agent, or Firm*—Foley & Lardner

[57] ABSTRACT

There is provided a β-1,3 glucan obtained by applying ultrasonic treatment in a mixed solution of an organic solvent containing at least dimethyl sulfoxide to remove the contaminant proteins and there is provided a coupling medium for a probe of an ultrasonograph comprised of a gel composed of a β-1,3 glucan, as a main component, from which contaminant proteins have been removed as a coupling medium for a probe of an ultrasonograph superior in physical properties and safety.

9 Claims, No Drawings ical load on the patient and to improve the

PROTEIN REMOVED β-1,3 GLUCAN AND COUPLING MEDIUM FOR PROBE OF ULTRASONOGRAPH CONTAINING SAME

TECHNICAL FIELD

The present invention relates to a technical field which relates to a β-1,3 glucan from which mainly contaminant proteins have been removed and a coupling medium for a probe of an ultrasonograph comprising a gel containing the β-1,3 glucan as a main component.

BACKGROUND ART

In recent years, various methods have been tried out to treat diseases without major surgery so as to lighten the physiological load on the patient and to improve the progress in recuperation. Also, even if an abdominal operation is to be performed, determination in detail of the state of diseased areas before surgery and determination of the internal state without having to cut open the organ surface during surgery would give very meaningful information at the time of actual surgery. To satisfy these needs, in recent years, ultrasonography has developed and spread remarkably. The accuracy of the diagnosis using this before surgery has been extremely helpful in improving results of surgery in recent years. In particular, striking improvements have been made in the ability to diagnose diseases of the thyroid glands by the combination of the ultrasonography and diagnosis of cells obtained by centesis and suction.

However, when trying to observe the internal state by placing the probe of the ultrasonograph directly on the body surface or organ surface, it is difficult to obtain a clear image in the region within several centimeters of the surface due to the nature of the ultrasonograph. Further, the actual body and organ surfaces are not flat, but have characteristic curves and unevenness, so it is impossible to bring an inflexible probe which maintains a certain shape into close contact with the desired location. That is, if air is present between the body and probe, the rate of propagation of the ultrasonic waves drops remarkably and an accurate image cannot be formed on the screen of the diagnostic apparatus.

To solve the above-mentioned problems, it is effective to interpose a suitable spacer (i.e., coupling medium) between the probe and body. The coupling medium is preferably in the form of a sheet and is sandwiched between the probe and the body surface at the time of diagnosis or is formed into a suitable shape and is used attached to the probe directly or with a fitting. Such a coupling medium is required to have a suitable flexibility and mechanical strength and improved acoustical characteristics (e.g., a low rate of ultrasonic attenuation etc.)

For example, Japanese Unexamined Patent Publication (Kokai) No. 55-63636 discloses a specific water-containing polymer gel. However, the gel disclosed has problems such as an insufficient mechanical strength or a large attenuation of sound waves. Various efforts have been made to solve with this problem.

For example, there are known a polyvinyl alcohol based polymer gel (Japanese Unexamined Patent Publication (Kokai) No. 62-298342, a high water absorbable resin (Japanese Unexamined Patent Publication (Kokai) No. 4-53544), and various organic and inorganic polymers (Japanese Examined Patent Publication (Kokoku) No. 2-21252).

However, these various proposed polymer gels also suffer from various problems. Specifically, media using polymer gels suffer from the danger of all or part of the gel entering and remaining in the body at the time of centesis or at the time of surgery, and therefore, there are apprehensions over the toxicity of the gel itself or the residual monomers to cause a problem in safety. Further, natural polymers and polyvinyl alcohol gels, which are considered highly safe, are not necessarily satisfactory in terms of their acoustical characteristics (for example, have a high attenuation rate). To improve this acoustical characteristics, it is necessary to raise the water content in the gel. However, when the water content is increased, there is the problem that the mechanical strength will decrease. Further, a polyvinyl alcohol gel tends to bleed water when pressure is applied, and therefore, is not suited as a gel for a probe used pressed against the body or organ surface. Further, it is poor in sterilizability (that is, it completely melts and loses its original shape under heating at 121° C. in an autoclave, the simplest method of sterilization). As a result, it is not yet commercialized. In view of this situation, development of a coupling medium for a probe which is safe and can be used even at the time of centesis and during surgery has been desired.

SUMMARY OF INVENTION

The present inventors engaged in intensive research on a material suitable as a coupling medium for a probe to take the place of such existing contact media for probes and as a result found that a gel composed of curdlan, one type of polysaccharide produced by microorganisms, and other β-1,3 glucans as main component can generally solve the problems in the above existing contact media for probes (see Japanese Unexamined Patent Publication (Kokai) No. 6-296611, Japanese Unexamined Patent Publication (Kokai) No. 7-124158, Japanese Unexamined Patent Publication (Kokai) No. 7-124154, Japanese Unexamined Patent Publication (Kokai) No. 7-88111, Japanese Unexamined Patent Publication (Kokai) No. 7-79970, etc.)

It is not, however, that there are no problems in these β-1,3 glucans.

That is, these β-1,3 glucans are mainly polysaccharides derived from microorganisms, and therefore, contaminants are often observed. Complete removal of these contaminants requires extremely complicated procedures. Depending on the type of the contaminant, complete removal is sometimes considered to be substantially difficult. These contaminants undeniably reduce the safety of a gel comprised primarily of β-1,3 glucans, which are inherently extremely superior as materials of contact media for probes, and the performance of the same as contact media of probes.

In particular, those which are considered to be difficult to completely remove from β-1,3 glucan are endotoxins and contaminant proteins.

The present inventors already established a means for removing endotoxins from β-1,3 glucan by treatment with an organic solvent containing an acid or base, but had not yet been removed contaminant proteins.

Therefore, the problem to be solved by the present invention is to establish a simple and effective means for removing contaminant proteins from β-1,3 glucan and provide a gel which contains primarily refined β-1,3 glucan superior in the above safety and performance as a material of a coupling medium for a probe.

The present inventors engaged in intensive studies so as to solve this problem. As a result, we found that it was possible to simply and efficiently remove contaminant proteins by treating the β-1,3 glucan ultrasonically in a mixed solvent of organic solvents containing at least dimethyl sulfoxide and thereby completed the present invention.

That is, in this application, the present inventors provide a β-1,3 glucan obtained by washing with a mixed solution of organic solvents containing at least dimethyl sulfoxide and further applying ultrasonic treatment to remove the contaminant proteins and further provides a coupling medium for a probe of an ultrasonograph composed of a gel containing such a β-1,3 glucan as a main component.

Note that it is desirable, in view of the nature of a coupling medium for a probe for an ultrasonograph, to further remove the endotoxins from the β-1,3 glucan obtained by removal of the contaminant proteins.

The mode of working the present invention will be explained below.

In the present invention, the "β-1,3 glucan" covered by the removal of the contaminant proteins is a general name for polysaccharides wherein almost all the D-glucose residual groups are joined by β-1,3 bonds.

Various types of β-1,3 glucan are known differing depending on the existence of side chains, branching, etc. In the present invention, for example, curdlan, scleroglucan, sclerotan, schizophyllan, lentinan, paramylon, callose, laminaran, etc. may be mentioned. Further, the present invention is not limited to the β-1,3 glucans mentioned here.

Note that, in general, β-1,3 glucans become more soluble in water when the number of side chains is large. They become insoluble in water by the selective cleavage of side chains by the method of Mild Smith decomposition etc. and start to take on the property of forming a gel by heat (Polym. J. 13 (12) 1135–1143 (1981)). Therefore, as the material of the standoff material for the probe of an ultrasonograph comprised of a gel containing the β-1,3 glucan as a main component, it is preferable to select a curdlan which is being stably supplied to the market at a comparatively low price, has a small proportion of the side chains to the β-1,3 bonds, and requires almost no selective cleavage of the side chains.

The refined β-1,3 glucans from which contaminant proteins were removed according to the present invention (also called the "refined β-1,3 glucan" of the present invention) can be produced by applying ultrasonic treatment to the above pre-refined β-1,3 glucan in a mixed solvent of organic solvents containing at least dimethyl sulfoxide.

The dimethyl sulfoxide contained in the mixed solution is a colorless, odorless, hygroscopic liquid, obtained by oxidizing dimethyl sulfide, having the chemical formula $CH_3SOCH_3$ which is generally used as a raw material for solvents or organic synthesis. In the present invention, it is of course possible to use a commercially available dimethyl sulfoxide.

Further, the organic solvent other than dimethyl sulfoxide is not particularly limited so long as it is compatible with dimethyl sulfoxide. For example, methanol, ethanol, n-propanol, isopropanol, n-butanol, sec-butanol, tert-butanol, pentanol, acetone, dioxane, acetonitrile, etc. may be mentioned.

In the present invention, it is possible to use, if necessary, one or more of the organic solvents other than the dimethyl sulfoxide and mix them with dimethyl sulfoxide to make the "organic solvent containing at least dimethyl sulfoxide" in the present invention (hereinafter also referred to as "dimethyl sulfoxide containing solvent").

The content of the dimethyl sulfoxide in the dimethyl sulfoxide containing solvent is 20.0% by volume to 90.0% by volume of the solvent, preferably 40.0% by volume to 60.0% by volume. If the content is less than 20.0% by volume, the ability of the system to dissolve protein is insufficient, while when over 90.0% by volume, part of the β-1,3 glucan itself is dissolved in the system, both of which are not preferable.

Further, the β-1,3 glucan added to the dimethyl sulfoxide containing solvent is preferably contained in an amount of 0.1% by weight to 10.0% by weight of the solvent. If the amount is less than 0.1% by weight of the solvent, the amount of the solvent with respect to the β-1,3 glucan from which the contaminant proteins are to be removed is too great and the efficiency of removal of the contaminant proteins falls, while when more than 10.0% by weight is added, the effect of removal of the contaminant proteins tends to be decreased.

By treating ultrasonically the β-1,3 glucan in the dimethyl sulfoxide containing solvent, it is possible to efficiently obtain the refined β-1,3 glucan of the present invention from which the contaminant protein is removed.

This ultrasonic treatment finely vibrates the β-1,3 glucan in the dimethyl sulfoxide containing solvent efficiently, whereby the efficiency of removal of the contaminant protein is remarkably improved. Therefore, it is possible to select the suitable conditions for the ultrasonic treatment (for example, the wavelength and treatment time) so far as the β-1,3 glucan is not excessively damaged or heat modification is not caused by this ultrasonic treatment.

For example, when ultrasonic treatment is performed at 20 kHz for 30 minutes as in the Examples, it is possible to efficiently remove the contaminant proteins from the β-1,3 glucan. However, the conditions of the ultrasonic treatment are not limited to these conditions. It is possible to select them depending upon the amount of the β-1,3 glucan with respect to the dimethyl sulfoxide containing solvent.

Note that it is also possible, for example, to use another method to vibrate the system, without using the ultrasonic treatment, whereby the contaminant proteins are removed from the β-1,3 glucan, but normally this does not allow the desired effect of removal of the contaminant proteins to be efficiently obtained, and therefore is not preferred.

It is possible to confirm whether or not the contaminant protein has been removed from the β-1,3 glucan by these steps by the ordinary known methods of assay of protein, for example, the Lowry method or the modification thereof.

Further, after the above-described process for removing the contaminant protein, it is preferable to perform (1) "a dimethyl sulfoxide removal process" for removing the dimethyl sulfoxide from the system, (2) "an endotoxin removal process" for removing the endotoxins from the system, and (3) "an alkali removal process" for removing the alkali used in the endotoxin removal process in order to obtain the refined β-1,3 glucan serving as the basis for obtaining the desired coupling medium for a probe of an ultrasonograph according to the present invention.

The dimethyl sulfoxide removal process (1) can be performed by washing the β-1,3 glucan of the present invention by a lower alcohol, preferably ethanol. In this process, it is possible and preferable to perform ultrasonic treatment on the system for the same reason as mentioned above.

The endotoxin removal process (2) can be performed by treating the β-1,3 glucan of the present invention with an alkali. In this process, it is possible and preferable to perform ultrasonic treatment on the system for the same reason as mentioned above.

The alkali removal process (3), can be performed by treating the refined β-1,3 glucan obtained by the above [2]. In this process, it is possible and preferable to perform ultrasonic treatment on the system for the same reason as mentioned above.

These steps (1) to (3) will be explained in more detail in the Examples.

By adding the refined β-1,3 glucan of the present invention obtained in this way to the gel production process, it is possible to obtain a coupling medium for a probe of an ultrasonograph according to the present invention.

This gel production process can be performed by the method already reported by the present invention.

For example, as the refined β-1,3 glucan of the present invention, first an explanation will be given of the case of selection of refined curdlan.

Curdlan is described in the Nihon Shokuhin Kogyokai Kaishi, Vol. 38, No. 8, 736–742 (1991) etc. and is a type of polysaccharide produced by microorganisms (*Alcaligenes faecalis* var. *myxogenes* or many strains or Agrobacterium or Rizobium) and has only D-glucose as a constituent saccharide. More than 99% of the glucoside bonds are β-1,3 bonds. Curdlan is insoluble in water, but dissolves in alkaline aqueous solutions of sodium hydroxide etc. Since it has such a property, it is in principle not necessary to effect the selective cleavage of the side chains of curdlan.

As a method of preparation of a homogeneous aqueous dispersion of refined curdlan, the method is known of adding water to refined curdlan powder and vigorously agitating this by a high speed homogenizer or cutter mixer etc. or adding curdlan to warm water at about 55° C., while agitating manually or by a propeller agitator etc., then cooling. A gel is formed by heating the aqueous dispersion.

The gel obtained by the heating may be classified into two main types, depending on the treatment temperature. That is, there are a non-heat reversible gel obtained by heating at least at 80° C. and a heat reversible gel obtained by heating at about 60° C. and then cooling. These are respectively called a high set gel and low set gel. It is also possible to prepare the desired gel, without heating, by dissolving the curdlan in an alkaline aqueous solution, allowed to stand, and neutralizing by carbonic acid gas etc. or using a dialysis membrane to remove the sodium hydroxide. Further, it is possible to form the desired gel by adding, to the alkaline aqueous solution, cations such as calcium, magnesium ions, to form a cross-linked structure by the dissociated hydroxy groups and cations.

The β-1,3 glucan other than refined curdlan may also be produced to form the desired gel by a method based on the above method of preparing a gel from refined curdlan, except that the selective cleavage of the side chains is carried out, if necessary.

The concentration of the above refined curdlan or other refined β-1,3 glucan in the dispersion such as the alkaline aqueous solution is generally 1.0 to 10.0% by weight, preferably 2.0 to 5.0% by weight. When the concentration of refined β-1,3 glucan in the dispersion is less than 1.0% by weight, the strength of the prepared gel tends strongly to become insufficient, while when more than 10.0% by weight, the viscosity of the dispersion becomes excessively high and there is a tendency for difficulty in obtaining a homogeneous gel not containing air bubbles. Further, in the sense of maintaining excellent acoustic characteristics of the coupling medium for a probe of an ultrasonograph composed of the gel as a main compound, from the viewpoint of the desirability of making the water content of the gel as high as possible, it is particularly preferable to make the content not more than 5.0% by weight with respect to the dispersion. From this viewpoint, a sufficient gel strength can be maintained when the content is 2.0% by weight or more based upon the dispersion.

Note that, in the process of preparation of the gel, it is possible to apply the various means already reported by the present inventors to improve the performance of the gel as a material for a coupling medium for a probe of an ultrasonograph.

For example, by adding a cross-linking agent to an alkaline aqueous solution of β-1,3 glucan prepared in the above preparation process of a gel, it is possible to prepare a stronger cross-linked gel (see Japanese Unexamined Patent Publication (Kokai) No. 7-124158).

Here, as the cross-linking agent to be added, it is possible to mention a cross-linking agent having at least two functional groups capable of reacting with a hydroxy group or carboxy group in a molecule. As the cross-linking agent, for example, (poly)ethyleneglycol glycidyl ethers, glycerol polyglycidyl ethers, and other polyhydric glycidyl ether compounds; 2,2-bishydroxymethylbutanol-tris[3-(1-aziridinyl)propionate], 1,6-hexamethylenediethyleneurea, diphenylmethane-bis-4,4'-N,N'-diethyleneurea, and other polyhydric aziridine compounds; ethylene diamine, diethylene triamine, triethylene tetramine, tetraethylene pentamine, pentaethylene hexamine, polyethylene imine, and other polyhydric amine compounds; 2,4-tolylene diisocyanate, hexamethylene diisocyanate, and other polyhydric isocyanate compounds; epichlorohydrin, epibromohydrin, β-methylepichlorohydrin, β-methylepibromohydrin, and other halomethyl oxirane compounds; etc. may be mentioned.

Normally, these cross-linking agents are added in an amount of 0.001% by weight to 2.0% by weight based upon the aqueous alkaline solution. By heating the system to about 50° C. after the end of the cross-linking reaction, neutralizing it, and washing fully with water, it is possible to remove the unreacted cross-linking agent from the system.

After the end of the cross-linking process, it is possible to prepare a stronger gel by devising the above heating or other gelation means.

Further, to prevent white cloudiness of the gel and ensure transparency as much as possible, it is possible to add a complex forming compound in an alkaline aqueous solution of the β-1,3 glucan prepared in the above gel preparation process (see Japanese Unexamined Patent Publication (Kokai) No. 7-88111).

As the complex forming compound which is added here, for example, boric acid, borax, phenyl boric acid, sulfonated phenylboric acid, germanic acid, molybdic acid, etc. may be exemplified.

Normally, these complex forming compounds are added in the range of 5 to 900 mM, preferably 30 to 400 mM, in the aqueous alkaline solution.

Further, to further improve the heat resistance of the gel, it is also possible to apply high pressure treatment after the end of the preparation process of the gel explained above (see Japanese Unexamined Patent Publication (Kokai) No. 7-124154).

That is, the gel prepared as explained above is cooled, then subjected to a high pressure treatment of at least 100 kg/cm$^2$, preferably at least 1000 kg/cm$^2$, then is sterilized (heated at a temperature of at least 60° C., preferably at least 80° C., for preferably at least 10 minutes or is irradiated with radiation), thereby obtaining a stronger gel which will not crack etc. even when treated in a high temperature and high pressure autoclave.

The coupling medium for a probe of an ultrasonograph according to the present invention, composed of the above mentioned gel as a main component, may contain therein, in addition to the main component β-1,3 glucan, other polymer substances, for example, alginic acid, carrageenan, agar-agar, glucomannan, starch, hyaluronic acid, cellulose, methylcellulose, ethylcellulose, nitrocellulose, and polyvinyl alcohols. Further, various types of salts, for example, sodium salts or potassium salts of phosphoric acid, acetic acid, lactic acid, and citric acid and sodium chloride may be added. Further, various types of saccharides, for example, glucose, sucrose, maltose, galactose, mannose, lactose, etc. may be added. Further, urea, glycerin, silicone, etc. may be added, according to need, alone or in mixtures of two or more types.

The coupling medium thus prepared for a probe of an ultrasonograph according to the present invention has a suitable flexibility and is extremely easy to be shaped and, thus, is extremely advantageous when thinking of connection between a probe having a certain shape and a coupling medium.

The coupling medium thus prepared for a probe of an ultrasonograph according to the present invention displays all excellent acoustical characteristics. That is, the sound velocity is 1485 to 1540 m/s, close to the case of water, and the attenuation rate is 0.06 to 0.20 dB/MHz·cm. Further, when the mechanical strength of the coupling medium was measured, it was found that the breaking strength was $5.43 \times 10^2$ to $1.32 \times 10^4$ g/cm$^2$ and the Young's modulus was $1.49 \times 10^6$ to $1.57 \times 10^7$ dyn/cm$^2$. This shows that the gel has sufficient strength for use as a probe coupling medium.

The coupling member for a probe for an ultrasonograph according to the present invention was one where the contaminant protein was removed from the starting β-1,3 glucan in addition to the above, and therefore, this coupling member for a probe is superior in safety to the contact member for a probe of an ultrasonograph using a conventional β-1,3 glucan as a raw material.

EXAMPLES

The present invention will be explained in further detail below with reference to Examples, but the technical scope of the present invention is not intended to be limited by these Examples.

Method of Assay of Proteins in β-1,3 Glucan

First, the method of assay of the contaminant proteins in the coupling medium for a probe of an ultrasonograph composed of a gel containing as a main component the β-1,3 glucan obtained by the Examples given below will be explained. In the Examples, a modification of the Lowry method was used to assay the protein.

That is, a 2% aqueous sodium carbonate solution was used as reagent (1), a 1% aqueous citric acid solution of 0.5% copper sulfate (II)-5-hydrate was used as reagent (2), a 50:1 mixed solution of the reagent (1):reagent (2) was used as reagent (3), and a ½ dilution of commercially available Folin phenol solution (made by Wako Pure Chemical Industries) was used as reagent (4).

Further, 10 mg of the reagent β-1,3 glucan) was dissolved in 1 ml of an aqueous solution of 1N sodium hydroxide and the mixture was diluted by water five-fold. Next, 2.0 ml of the reagent (3) was added to 1 ml of this dilution and the result agitated at room temperature for 15 minutes, 30 seconds. Next, 0.2 ml of the reagent (4) was added and the result allowed to stand at room temperature for 30 minutes. This was allowed to stand for 30 minutes, then a spectrophotometer (made by Japan Spectroscopic, Ubest V-550) was used to measure the absorbance at a wavelength of 660 nm. Note that the standard was made bovine serum albumin. A calibration curve was prepared at a concentration of 0.01 ppm to 5 ppm. The concentration of the protein was calculated accordingly.

This method was used to assay the contaminant proteins in the curdlan powder (made by Takeda Chemical Industries) used in the following examples, whereupon it was found to be 0.8%. Further, the content in lentinan (made by Ajinomoto) was found to be 1.2%. Further, the content in scleroglucan (made by San-Ei Gen F.F.I. Inc.) was found to be 0.9%.

Example 1

Preparation of Gel Using β-1,3 Glucan (1)

A mixed solution of dimethyl sulfoxide (250 ml) and ethanol (250 ml) was added to 27.5 g of curdlan (made by Takeda Chemical Industries). The mixture was then subjected to ultrasonic treatment at room temperature for 30 minutes (20 kHz). Next, the curdlan was obtained by filtration, ethanol (500 ml) was added to the filtered curdlan, and the same ultrasonic treatment as above was applied for 30 minutes. The curdlan was obtained by filtration, an aqueous solution (10 ml) of ethanol (475 ml), water (15 ml), and 5N sodium hydroxide was added to the curdlan thus filtered, the same ultrasonic treatment as above was applied for 30 minutes, the result was allowed to stand for 1 hour, then the supernatent was removed.

Next, injection water (150 ml) was added to the system, the same ultrasonic treatment as above was performed for 30 minutes again, then the supernatent was removed. This operation was repeated further 2 times, then the curdlan was taken out as a precipitate and the contaminant protein was assayed by the above assay method, whereupon the concentration of protein was found to be not more than 0.01%.

A mixed solution of 24 ml of a 5N aqueous sodium hydroxide solution and 510 ml of injection water was added to the refined curdlan to dissolve the refined curdlan. 50 ml of 5N hydrochloric acid was added to this to adjust the pH to 7.0, then the mixture was agitated by a homogenizer (made by Nippon Seiki, Power Homogenizer PM1) for 10 minutes. The refined curdlan dispersion thus prepared was fully deaerated in vacuum, then injected to a mold. This was heated at 80° C. for 20 minutes for gelation. Next, the gel was cooled and taken out of the mold, then was heated in an autoclave at 121° C. for 20 minutes to obtain the desired gel.

Example 2

Preparation of Gel Using β-1,3 Glucan (2)

A mixed solution of dimethyl sulfoxide (250 ml) and methanol (250 ml) was added to 27.5 g of lentinan (made by Ajinomoto). The mixture was then subjected to ultrasonic treatment at room temperature for 30 minutes (20 kHz). Next, the lentinan was obtained by filtration, ethanol (500 ml) was added to the filtered lentinan, and the same ultrasonic treatment as above was applied for 30 minutes. The lentinan was obtained by filtration, an aqueous solution (10 ml) of ethanol (475 ml), water (10 ml), and 5N sodium hydroxide was added to the lentinan, thus filtered the same ultrasonic treatment as above was applied for 30 minutes, the resultant mixture was allowed to stand for 1 hour, then the supernatent was removed.

Next, injection water (150 ml) was added to the system, the same ultrasonic treatment as above was performed for 30 minutes again, then the supernatent was removed. This operation was repeated further 2 times, then the lentinan was taken out as a precipitate and the contaminant protein was assayed by the above assay method, whereupon the concentration of protein was found to be not more than 0.01%.

Example 3

Preparation of Gel Using β-1,3 Glucan

A mixed solution of dimethyl sulfoxide (250 ml) and acetone (250 ml) was added to 27.5 g of scleroglucan (made by San-Ei Gen F.F.I. Inc.). The mixture was then subjected to ultrasonic treatment at room temperature for 30 minutes (20 kHz). Next, the scleroglucan was obtained by filtration, ethanol (500 ml) was added to the filtered scleroglucan, and the same ultrasonic treatment as above was applied for 30 minutes. The scleroglucan was obtained by filtration, an aqueous solution (10 ml) of ethanol (475 ml), water (10 ml), and 5N sodium hydroxide was added to the scleroglucan thus filtered, the same ultrasonic treatment as above was applied for 30 minutes, the resultant mixture was allowed to stand for 1 hour, then the supernatant was removed.

Next, injection water (150 ml) was added to the system, the same ultrasonic treatment as above was performed for 30 minutes again, then the supernatant was removed. This operation was repeated further 2 times, then the scleroglucan was taken out as a precipitate and the contaminant protein was assayed by the above assay method, whereupon the concentration of protein was found to be not more than 0.01%.

From the results of Examples 1 to 3, in the present invention, it is clearly possible to reduce the contaminant protein in the β-1,3 glucan up to less than 0.01%—which can be said to be the limit of measurement in the above method of assay. The refined β-1,3 glucan used in the present invention clearly has an extremely high rate of removal of contaminant proteins and is useful as a material for a coupling medium for a probe of an ultrasonograph.

Example 4

Study of Properties of Probe Coupling medium of Gel Obtained

The physical properties of the gel obtained in Example 1 were measured by a rheometer (made by Fudo Kogyo (K.K.), NRM-2010J-CW), wherein a breaking strength of $2.3 \times 1000$ g·f/cm$^2$ and a Young's modulus of $5.0 \times 10^6$ dyn/cm$^2$ were exhibited. Further, the acoustic characteristics of the gel were measured, whereupon the sound velocity was found to be 1495 m/s and the attenuation rate was found to be $1.12 \times 10^{-1}$ dB/MHZ·cm.

Next, this gel is placed as a coupling medium between the probe of the ultrasonograph (SSD-2000 (made by Aroka Co.)) and the skin for image diagnosis of the neck of a human subject, whereupon a clearer sharper image is obtained compared with the case of no gel interposed between the probe and the skin.

Further, to confirm the safety of the gel, an embedded toxicity test based on ISO standard (9001) was performed using rabbits, wherein the gel was found to conform with the embedded test standards.

In this way, the gel containing the refined β-1,3 glucan of the present invention is of course superior as a coupling medium for a probe of an ultrasonograph in terms of its physical properties and acoustic characteristics and is extremely superior in safety as well.

According to the present invention, there is provided a β-1,3 glucan from which contaminant proteins are simply and efficiently removed and there is provided a coupling medium for a probe of an ultrasonograph superior in physical properties and safety composed of a gel containing this refined β-1,3 glucan as a main component.

What is claimed is:

1. β-1,3 glucan, wherefrom contaminant protein has been removed by ultrasonic treatment in a mixed solution of an organic solvent containing at least dimethyl sulfoxide, said β-1,3 glucan having been recovered from the mixed solution.

2. The β-1,3 glucan according to claim 1, wherefrom endotoxins have been removed.

3. A coupling medium for a probe of an ultrasonograph comprising a gel composed of the β-1,3-glucan according to claim 1 as a main component.

4. A coupling medium for a probe of an ultrasonograph comprising a gel composed of the β-1,3-glucan according to claim 2 as a main component.

5. The β-1,3 glucan as claimed in claim 1, wherein the contaminant proteins is removed by ultrasonic treatment in a mixed solution of an organic solvent containing 20 to 90% by volume, based upon the total volume of the solvent, of dimethyl sulfoxide.

6. The β-1,3 glucan as claimed in claim 1, wherein the organic solvent contain 40 to 60% by volume of dimethyl sulfoxide, based upon the total volume of the solvent.

7. The β-1,3 glucan as claimed in claim 1, which contains 0.01% or less by weight of contaminant protein.

8. A method for removing contaminant protein from β-1,3 glucan, comprising ultrasonically treating the β-1,3 glucan in a mixed solution of an organic solvent containing 20 to 90% by volume, based upon the total volume of the solvent, of dimethyl sulfoxide, and recovering β-1,3 glucan from the mixed solution.

9. The method of claim 8, wherein the organic solvent contain 40 to 60% by volume of dimethyl sulfoxide, based upon the total volume of the solvent.

* * * * *